US009207887B1

(12) United States Patent
Lahey et al.

(10) Patent No.: US 9,207,887 B1
(45) Date of Patent: Dec. 8, 2015

(54) PRESENTATION OF PREDICTED STEPS IN A PRINT WORKFLOW

(71) Applicants: Leonard Corning Lahey, Boulder, CO (US); Linda Sue Liebelt, Boulder, CO (US); Robert Patrick Smyth, Thornton, CO (US); Marquis G. Waller, Beverly, OH (US); Scott Thomas Ziegler, Boulder, CO (US)

(72) Inventors: Leonard Corning Lahey, Boulder, CO (US); Linda Sue Liebelt, Boulder, CO (US); Robert Patrick Smyth, Thornton, CO (US); Marquis G. Waller, Beverly, OH (US); Scott Thomas Ziegler, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/481,517

(22) Filed: Sep. 9, 2014

(51) Int. Cl.
*G06F 3/12* (2006.01)
*G06K 15/00* (2006.01)
*G06K 15/02* (2006.01)

(52) U.S. Cl.
CPC ............ *G06F 3/1208* (2013.01); *G06F 3/1211* (2013.01); *G06F 3/1256* (2013.01); *G06F 3/1258* (2013.01); *G06F 3/1275* (2013.01); *G06K 15/005* (2013.01); *G06K 15/1809* (2013.01); *G06K 15/1823* (2013.01)

(58) Field of Classification Search
CPC ..... G06F 3/1275; G06F 3/1285; G06F 3/126; G06F 3/1243; G06F 3/1296; G06F 3/1211; G06F 3/1259; G06F 3/1238; G06F 3/129; G06F 2206/1512; G06F 3/1241; G06F 8/34; H04N 1/00408

USPC ........................ 358/1.15, 1.13, 1.14, 1.9, 1.16; 709/203, 223; 382/128, 167, 314; 714/E11.002, 57
See application file for complete search history.

(56) References Cited

U.S. PATENT DOCUMENTS

| | | | |
|---|---|---|---|
| 6,239,802 B1 * | 5/2001 | Lahey et al. ................... | 715/810 |
| 6,345,288 B1 * | 2/2002 | Reed et al. ..................... | 709/201 |
| 6,384,923 B1 * | 5/2002 | Lahey ............................ | 358/1.13 |
| 6,407,820 B1 * | 6/2002 | Hansen et al. ................. | 358/1.12 |
| 6,411,314 B1 * | 6/2002 | Hansen et al. ................. | 715/769 |
| 6,725,428 B1 | 4/2004 | Pareschi et al. | |
| 8,195,321 B2 | 6/2012 | Mackelprang et al. | |
| 8,555,206 B2 | 10/2013 | Pederson et al. | |
| 8,635,623 B2 * | 1/2014 | Sekine et al. .................. | 718/104 |
| 8,639,645 B2 | 1/2014 | Deshpande et al. | |

(Continued)

OTHER PUBLICATIONS

Avanti slingshot. http://www.avantisystems.com/wp-content/uploads/2013/08/Avanti-Slingshot-brochure_Sept2013.pdf.

(Continued)

*Primary Examiner* — Negussie Worku
(74) *Attorney, Agent, or Firm* — Duft Bornsen & Fettig LLP

(57) ABSTRACT

System and methods for presentation of predicted steps in a print workflow. One embodiment is a system that identifies a print workflow with interconnected steps of multiple potential paths. The system identifies a print job, generates a copy of the print job, and simulates execution a step in the print workflow with the copy of the print job. The execution comprises: determining whether the step includes conditional branching, and, when the step includes conditional branching, predicting a subsequent step by evaluating conditions of the step against property values of the copy of the print job. The execution also comprises updating the property values based on the execution of the step. The system repeats the execution for each subsequently predicted step to predict a path of the print job. The system includes a graphical user interface to display the path that is predicted for the print job in the print workflow.

18 Claims, 7 Drawing Sheets

(56) References Cited

U.S. PATENT DOCUMENTS

| | | | |
|---|---|---|---|
| 8,769,127 B2* | 7/2014 | Selimis et al. | 709/229 |
| 2010/0115445 A1 | 5/2010 | Jambor-Sadeghi | |
| 2010/0169142 A1 | 7/2010 | Hinton et al. | |
| 2012/0054095 A1* | 3/2012 | Lesandro et al. | 705/39 |
| 2012/0212769 A1* | 8/2012 | Gaertner et al. | 358/1.15 |
| 2013/0208315 A1 | 8/2013 | Zeng et al. | |
| 2013/0293926 A1 | 11/2013 | Giannetti et al. | |
| 2014/0007127 A1 | 1/2014 | Amir et al. | |
| 2014/0240745 A1* | 8/2014 | Boldt et al. | 358/1.14 |
| 2014/0240754 A1* | 8/2014 | Smyth et al. | 358/1.15 |
| 2015/0135214 A1* | 5/2015 | Reisman | 725/37 |

OTHER PUBLICATIONS

Business workflow explorer. Embedded processes (SAP business workflow). http://help.sap.com/saphelp_erp60_sp/helpdata/en/c5/e4a957453d11d189430000e829fbbd/content.htm?frameset=/en/0b/a7f042011f11d3a6500060087a79ea/frameset.htm See highlighted portions.

\* cited by examiner

FIG. 6

| | STEP | | PHASE | CONDITIONS | DURATION | UNIT 1 | FOR EVERY | UNIT 2 |
|---|---|---|---|---|---|---|---|---|
| ☐ | SET PROPERTIES | 502 | RECEIVE | HOLD | 10 | MIN | 1 | JOB(S) |
| ☐ | COUNT PAGE | 504 | PREPARE | | 3 | SEC | 1 | JOB(S) |
| ☐ | BUILD PDF | 506 | ASSEMBLE | IF PDF | 25 | SEC | 1000 | KILOBYTE(S) |
| ☐ | SET PROPERTIES | 508 | ASSEMBLE | | 10 | SEC | 1 | JOB(S) |
| ☒ | BUILD AFP | 510 | ASSEMBLE | ELSE | 20 | SEC | 1000 | KILOBYTE(S) |
| ☐ | SET PROPERTIES | 512 | ASSEMBLE | SHIFT IMAGE | 20 | SEC | 1000 | KILOBYTE(S) |
| ☐ | INDEX AFP | 514 | ASSEMBLE | AFP LIBRARY | 30 | SEC | 1 | JOB(S) |
| ☐ | PRINTER A | 516 | PRINT | IF < 10,000 PAGE | 1 | HOUR | 1 | JOB(S) |
| ☐ | PRINTER B | 518 | PRINT | IF > 10,000 PAGE | 1.5 | HOUR | 1 | JOB(S) |
| ☐ | ARCHIVE | 520 | COMPLETE | RETAIN | 30 | SEC | 1 | JOB(S) |

STEP EDITOR

600

☒ DURATION ▼ TO: 30 ▼ APPLY ESTIMATED COMPLETION TIME: 2 HR, 10 MIN, 35 SEC

PRESENTATION OF PREDICTED STEPS IN A PRINT WORKFLOW

FIELD OF THE INVENTION

The invention relates to the field of printing systems and, in particular, to print workflows.

BACKGROUND

A print shop handles the production and organization of documents on a large scale. For example, in addition to receiving and processing large print jobs (e.g., hundreds or thousands of documents) from a plurality of clients for printing on high-speed printers, a print shop may include a number of modules that perform post-print handling such as inserting and mailing of the documents. Because of this enhanced functionality, print shops are useful for numerous high-volume printing applications such as mass-mail printing of time sensitive statements and bills.

Each print job sent to the print shop is associated with a print workflow, which is an ordered set of activities to perform at the print shop to transform the electronic data of the print job into a deliverable physical product for a customer. A typical workflow includes a series of steps, for example, "pre-flighting" the print job to check for errors, rendering the print job, physically printing and drying the print job, proofing the printed job, generating billing for a customer, shipping, and removing the print job from the system. Because print jobs typically request different types of processing, the specific workflow associated with a given print job may vary on a job-by-job basis.

SUMMARY

Embodiments described herein provide for presentation of predicted steps in a print workflow. A print job is simulated in a print workflow in order to predict a series of subsequent steps in the print workflow that have yet to be performed for the print job. The display of the projected path of the print job based on its current job properties enables a user to foresee an anticipated outcome of the print job and therefore determine whether any changes to the print job are desired before the print job is actually processed through the print workflow.

One embodiment is a system that includes a controller configured to identify a print workflow. The print workflow includes interconnected steps that perform processing tasks for print jobs. At least one of the steps includes conditional branching of multiple potential paths for print jobs through the print workflow. The controller is also configured to identify a print job, to generate a copy of the print job, and to simulate an execution of a step in the print workflow with the copy of the print job. The execution comprises: determining whether the step includes conditional branching, and, when the step includes conditional branching, predicting a subsequent step by evaluating conditions of the step against copied job properties of the print job. The execution also comprises updating the copied job properties based on the execution of the step. The controller is also configured to repeat the execution for each subsequently predicted step in the print workflow in order to predict a path of the print job in the print workflow. The system also includes a graphical user interface (GUI) configured to display the path that is predicted for the print job in the print workflow.

The above summary provides a basic understanding of some aspects of the specification. This summary is not an extensive overview of the specification. It is not intended to identify key or critical elements of the specification nor to delineate any scope of particular embodiments of the specification, or any scope of the claims. Its sole purpose is to present some concepts of the specification in a simplified form as a prelude to the more detailed description that is presented later. Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 6 illustrates a GUI for editing steps of a print workflow in an exemplary embodiment.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
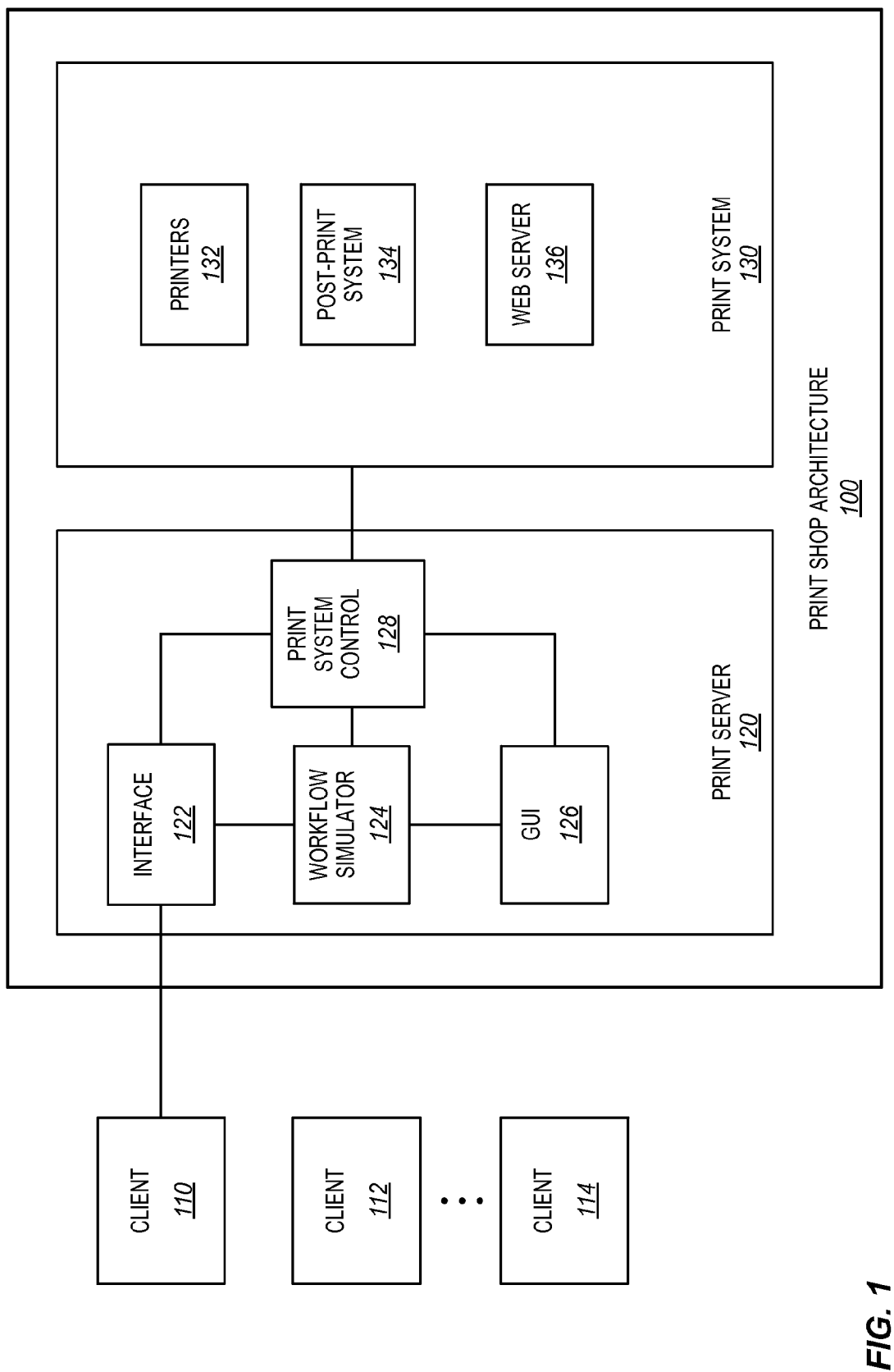
FIG. 1 is a block diagram of a print shop architecture 100 in an exemplary embodiment.

FIG. 1 is a block diagram illustrating a print shop architecture 100 in an exemplary embodiment. The print shop architecture 100 includes a print server 120, which functionally connects one or more clients 110-114 to objects in a print system 130. Clients 110-114 may be servers or software applications used by print shop customers that submit print data and job tickets to the print server 120.

The print server 120 includes print system control 128 operable to generate/receive print workflows for incoming print jobs and to manage objects within the print system 130 accordingly. The print server 120 also includes a workflow simulator 124 that is operable to perform a simulation of a print job through a print workflow. An interface 122 provides communication between the clients 110-114 and the print server 120. In order to aid an operator of the print shop in creating a print workflow for a print job, a Graphical User Interface (GUI) 126 is provided for manipulation of print workflows.

The print system 130 includes the devices and components of the print shop that perform print shop activities. For instance, the print system 130 may include one or more printers 132 for transforming print data onto a suitable printable medium, a post-print system 134 for performing various post-print operations, such as cutting, stapling, folding, inserting, mailing, shipping, etc., and a web server 136 for generating emails, web content, etc. Objects of the print system 130 may exist within the confines of the print shop itself, or may comprise off-site devices and functional components managed by the print server 120, and may further include manual tasks performed by personnel.

Figure 2:
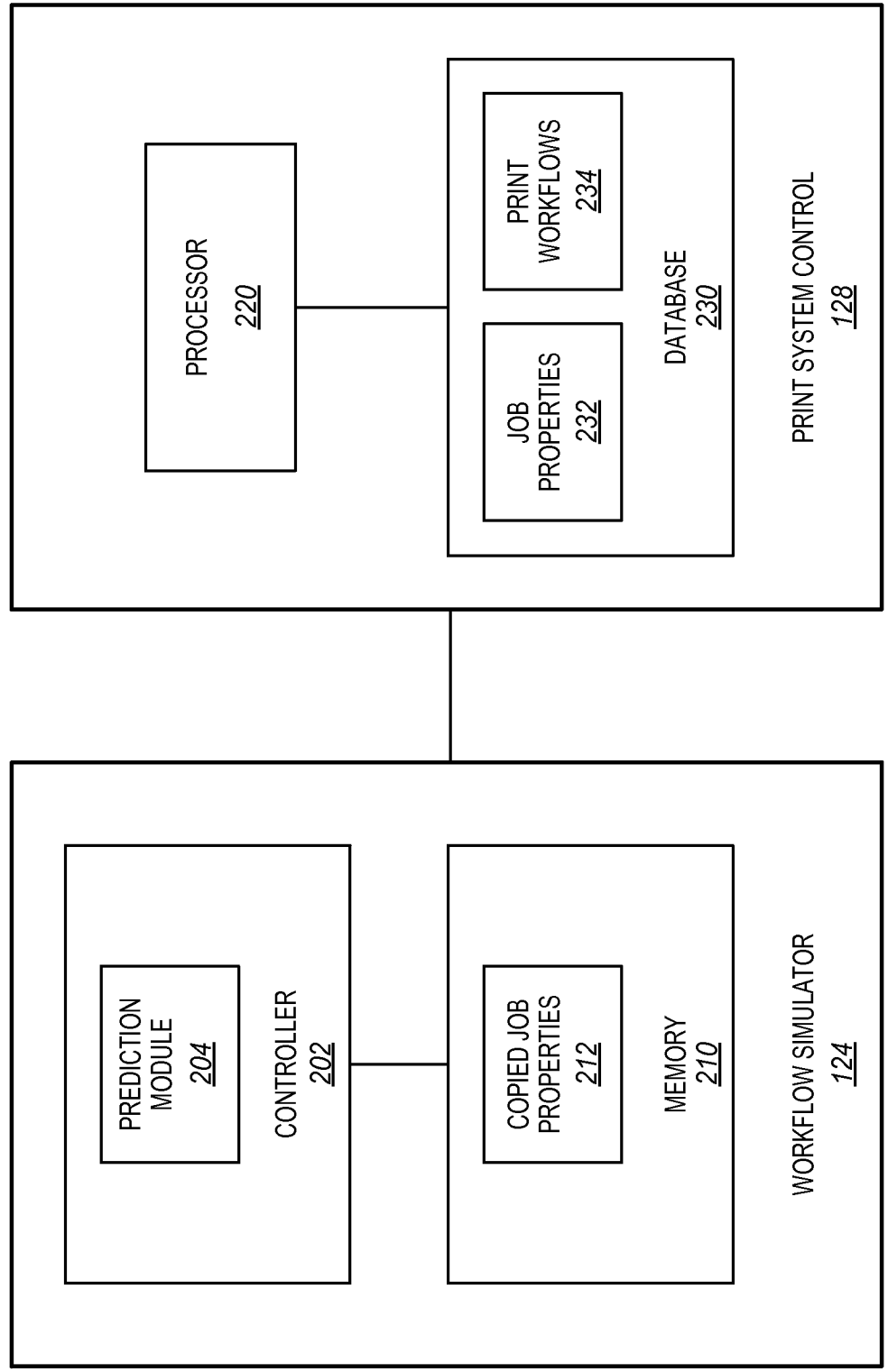
FIG. 2 is a block diagram of a workflow simulator and print system control in an exemplary embodiment.

Additional details of the print server 120 are described with respect to FIG. 2. FIG. 2 is a block diagram illustrating print system control 128 and workflow simulator 124 in an exemplary embodiment. The print system control 128 includes processor 220 that identifies and manages available activities of the print system 130. Certain print shop activities may be logically related with each other so that they have order and dependency relationships. Moreover, certain activities may be prioritized, altered or may be required or optional based upon specific clients, customers, or information in a job ticket of the print job. These logical relationships and workflow rules are defined in what is referred to as a print workflow.

Figure 3:
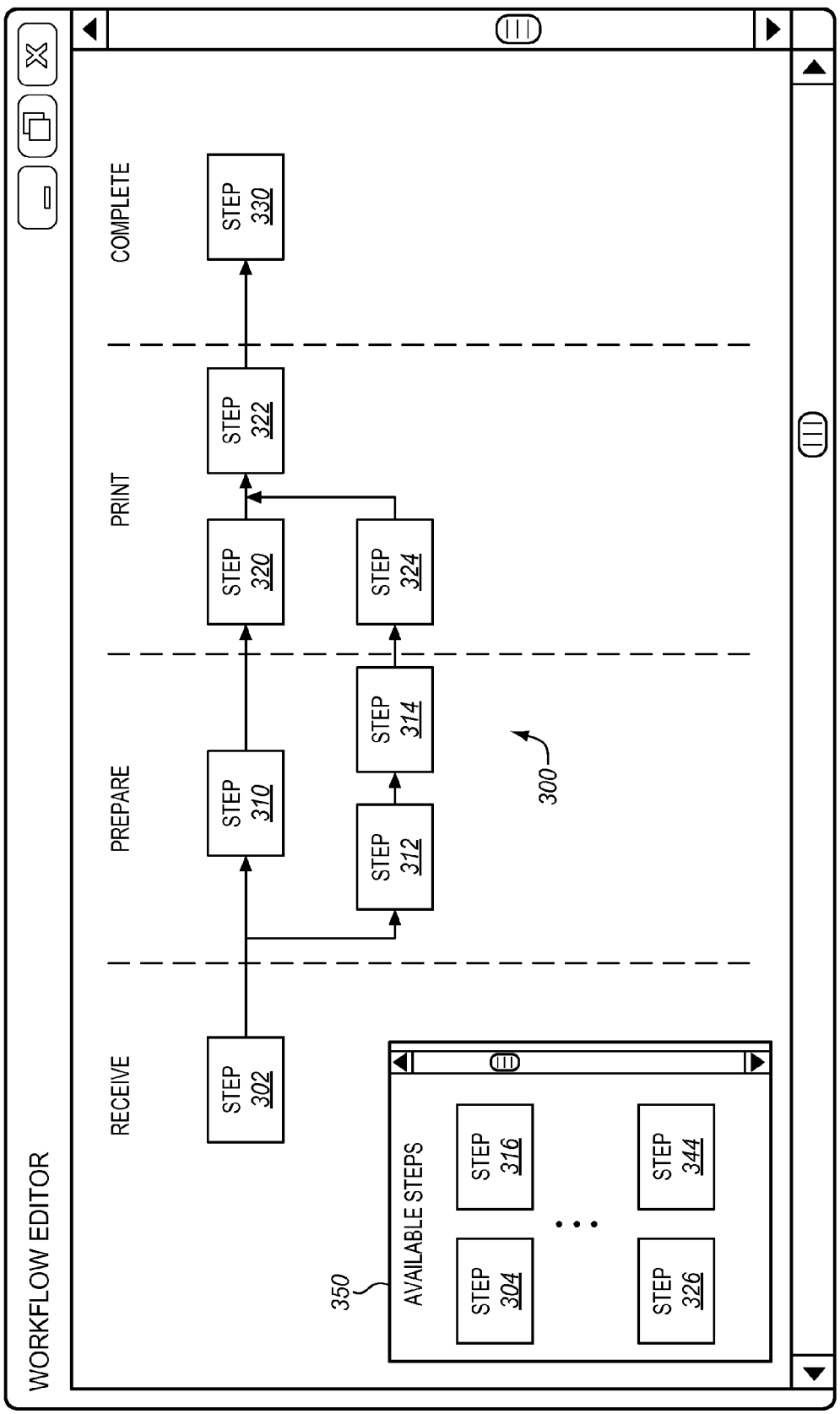
FIG. 3 is a block diagram illustrating a Graphical User Interface (GUI) for generating and editing a print workflow in an exemplary embodiment.

FIG. 3 is a block diagram illustrating a graphical user interface (e.g., GUI 126 of print server 120) for generating and editing a print workflow 300 in an exemplary embodiment. A user may drag-and-drop available steps 350 (e.g., activities of print system 130) into phases (e.g., Receive, Prepare, Print, Complete) and make logical connections between the steps to form a print workflow 300. Each phase may include a step or sequence of steps that perform a logical set of actions in the print system 130. In general, each step receives input, processes the input based on rules/parameters configured for that step, and forwards a generated output to the next step in the sequence. A step may include logic that indicates conditions to be satisfied before (or after) that step is performed.

The print workflow 300 shows an exemplary grid of interconnected steps configured such that a print job may take one of multiple potential conditional branches or paths, sometimes referred to as a non-linear print workflow. For instance, a print job may be processed according to a first path that includes steps 302, 310, 320, 322, and 330, or alternatively may be processed according a second path that includes steps 302, 312, 314, 324, 322, and 330. Decisions regarding the particular path that is taken in the print workflow may be based on job properties associated with the particular print job being processed in the print workflow. For example, a print job may proceed to be processed at step 310 if it exceeds 10,000 pages, otherwise the print job may proceed to be processed at step 312. As shown in the print workflow 300, a conditional branch (e.g., the decision to proceed to step 310 or step 312) may alter the sequence of steps performed in subsequent phases. Rules, sequencing, conditional branching, etc., of the steps may be configured by matter of design choice, although some steps may be associated with a specific phase.

Returning to FIG. 2, the processor 220 of the print system control 128 allows a user to generate print workflows 234. Database 230 stores print workflows 234 along with job properties 232 of print jobs received from clients 110-114. Job properties define the characteristics of print jobs and control aspects of job processing and printing. Generally, job properties for a print job may change during workflow processing of the print job. For example, PDL (Page Description Language) print data is rasterized into bitmaps and/or sheetsides, job tickets are updated with information regarding insert sheets, which type of media to use, etc. Thus, job properties may be set in a variety of ways, such as with configured parameters of a print workflow when a print job is processing, with print data sent with the print job, or via an administrator on a job-by-job basis.

In operation, the processor 220 executes steps of a print workflow and updates or adds job properties 232 in the database 230 for the print job being processed. The print workflows 234 may vary in accordance with customer or print shop needs, and therefore each print workflow may include a unique network of conditional branches and rules. Due to the variety of possible workflow paths and potential changes to job properties it is difficult for users to determine whether a print job will be completed on time and without errors unless and until the print job is actually processed through the print workflow.

The print server 120 is therefore enhanced with workflow simulator 124 that is operable to perform a simulation of a print job through a print workflow. The controller 202 receives/retrieves information of a print job and generates a "mock" print job internally with similar or matching job properties that are stored as copied job properties 212 in memory 210. The controller 202 includes a prediction module 204 that processes the copied job properties 212 through a print workflow to predict steps in the print workflow that have yet to be actually performed on the original print job. The prediction module 204 evaluates individual steps in the print workflow and updates the copied job properties 212 in memory 210 accordingly (e.g., runs each step in the print workflow as the print job would to get updated property values). The prediction module 204 therefore accurately predicts a path of the print job step-by-step because each step is evaluated with copied job properties 212 that have been appropriately processed and updated by the step that precedes it.

The prediction module 204 advantageously processes the copied job properties 212 in memory 210 without affecting the job properties 232 of the print job that are stored in the database 230. The prediction module 204 is communicatively coupled with a display device (e.g., GUI 126) to display the predicted path, thereby enabling a user to see the remaining steps (and/or steps already taken) for the print job. The information displayed to the user facilitates scheduling and print workflow assessment and allows for anticipation of any changes to be made in the system to ensure deadlines are met and print jobs are processed efficiently.

Figure 4:
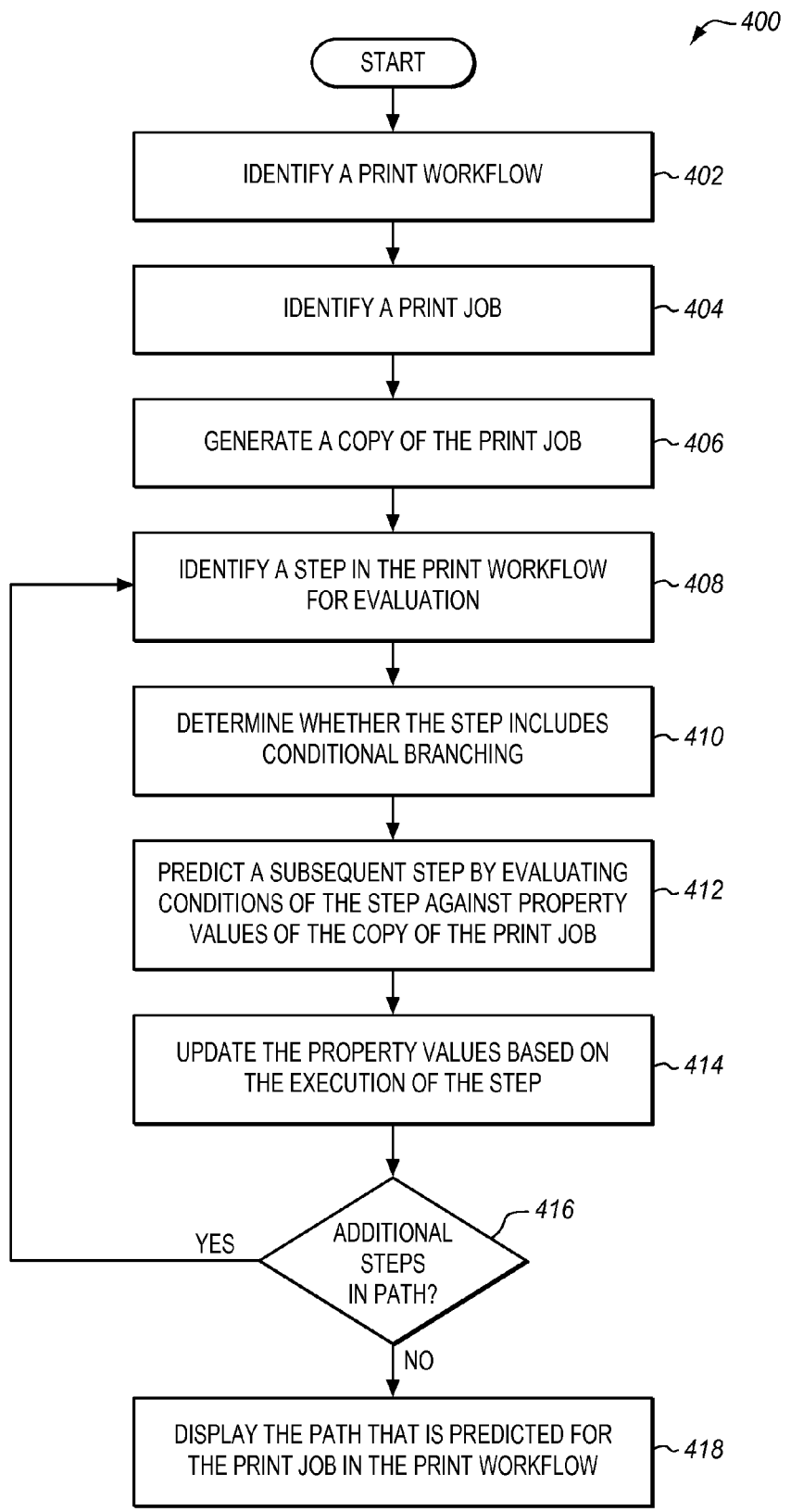
FIG. 4 is a flowchart illustrating a method for operating a print workflow simulator in an exemplary embodiment.

FIG. 4 is a flow chart illustrating a method 400 for operating a workflow simulator 124 in an exemplary embodiment. The steps of the method 400 will be described with respect to the print server 120 of FIG. 1, although one skilled in the art will understand that method 400 may be performed by other systems not shown. The steps of the method 400 described herein are not all inclusive and may include other steps not shown. The steps for the flow charts shown herein may also be performed in an alternative order.

At step 402, the controller 202 identifies a print workflow in the database 230. At step 404, the controller 202 identifies a print job in the database 230. A print job may be associated with a particular print workflow to direct the processing of the print job. For example, a print job and a print workflow may each be associated with a job type, and a value of the job type determines the particular print workflow the print job receives when moving through the system.

At step 406, the controller 202 generates a copy of the print job. In one embodiment, the controller 202 accesses the database 230 and duplicates job properties 232 of the print job stored in database 230 to memory 210 as copied job properties 212. The job properties 232 reflect a current processing status of the print job in the print workflow. In other words, the job properties 232 may reflect values set by the client that sent the print job (e.g., if no steps of the print workflow have executed), or alternatively, the job properties 232 may have been set/updated by processor 220 (e.g., one or more steps of the print workflow have executed).

At step 408, the controller 202 identifies a step in the print workflow for evaluation. In one embodiment, the controller 202 identifies a current step in the print workflow that is being executed for the print job. For example, if the processor 220 is currently executing, but has not completed a step in the print workflow, the controller 202 may identify that step for evaluation. Alternatively, the controller 202 may identify the first step to be performed as defined in the configuration of the print workflow.

At step 410, the controller 202 determines whether the step includes conditional branching. If the step includes conditional logic which branches print jobs into multiple potential paths, the controller 202 predicts a subsequent step in the print workflow by evaluating conditions of the step against the values of the copied job properties 212, in step 412. If the step does not include such conditional logic, the controller 202 predicts a subsequent step by identifying the adjacently connected step defined in the configuration of the print workflow.

At step 414, the controller 202 updates the copied job properties 212 based on execution of the step. For example, regardless as to whether the step includes conditional logic which branches print jobs into multiple potential paths, the step may include rules which set or update properties and/or property values of the print job. Thus, the controller 202 evaluates processing rules/parameters that are configured for that step and updates the copied job properties 212 accordingly. This ensures appropriate evaluation of a subsequently predicted step (e.g., step identified in step 412) due to any updates/changes to job properties as a result of the preceding step.

In step 416, the controller 202 determines whether there are additional steps to be evaluated. For example, the controller 202 may determine that a terminal step in the print workflow has been evaluated and there are no subsequent steps. Or, the controller 202 may determine that the most recently evaluated step contains impermissible values that trigger an error condition. In any case, if there are no subsequent steps, the method 400 proceeds to step 418, and the controller 202 directs a display device (e.g., GUI 126) to display the path that is predicted for the print job in the print workflow. Otherwise, if there are additional subsequent steps, the controller 202 repeats steps 408-416 on the subsequently predicted step (e.g., the step predicted in step 412).

As each step is evaluated in the method 400, a path is formed comprised of a series of consecutive steps which are likely to be executed in the future for transformation of a print job into a deliverable product for a customer. The predicted path alerts a user to any problems which might arise for processing a print job well before it is processed in the print system 130. Thus, appropriate changes may be made to the print job or print workflow in advance to increase efficiency, meet deadlines, or avoid errors. Additionally, the controller 202 may re-simulate a print job through a print workflow with any user-applied changes in memory 210 (e.g., changes to copied job properties 212, print workflow, individual step, etc.) so that a determination as to whether the hypothetical changes may improve processing in the print workflow without affecting any processing being performed on the print job by the processor 220 from the database 230.

In one embodiment, each step that is evaluated by the controller 202 is associated with an assigned duration value. The controller 202 sums the duration value of each step included in the predicted path of the print job to determine an estimated completion time for the print job. The steps may be assigned duration values via a user interface or based on collected statistical data of past use. In another embodiment, the controller 202 directs a GUI to visually display a configuration of the print workflow such that the path and steps that the print job is predicted to take (and/or not to take) in the print workflow are identified graphically. Additionally, the path and steps that the print job has already taken in the print workflow may also be graphically identified. Such graphical indications may include use of various different colors, line widths, line dashes, or other types of visual notifications.

In another embodiment, one or more of the steps evaluated by the controller 202 may be configured to perform activities that run an external program or activity. If the controller 202 determines that an external resource is to be created in accordance with the processing conditions of the step, then the controller 202 may skip evaluation of the step, though the controller 202 may still take into account any assigned duration values associated with the skipped step. In yet another embodiment, the controller 202 is configured to direct display of the predicted path substantially in real time. Thus, the controller 202 need not wait to determine a terminal step of a predicted path before displaying the path. As such, a visual graphic of the predicted path may be presented as the controller 202 simulates the print job in the print workflow.

In another embodiment, the controller 202 tracks information of multiple print jobs (and/or multiple simulated print jobs) with respect to an individual step. For example, the controller 202 may enable a user to select a step in a print workflow and view how each of a plurality of print jobs were predicted to arrive at that step. Such information may be used to identify and correct bottlenecks in the print system 130. For instance, a step that is to have several print jobs arrive in or near the same time period may be identified so that processing delays are avoided. Changes to the print workflow, step rules, or hardware (e.g., more printers) may be made such that process improvements are realized.

Examples

Figure 5:
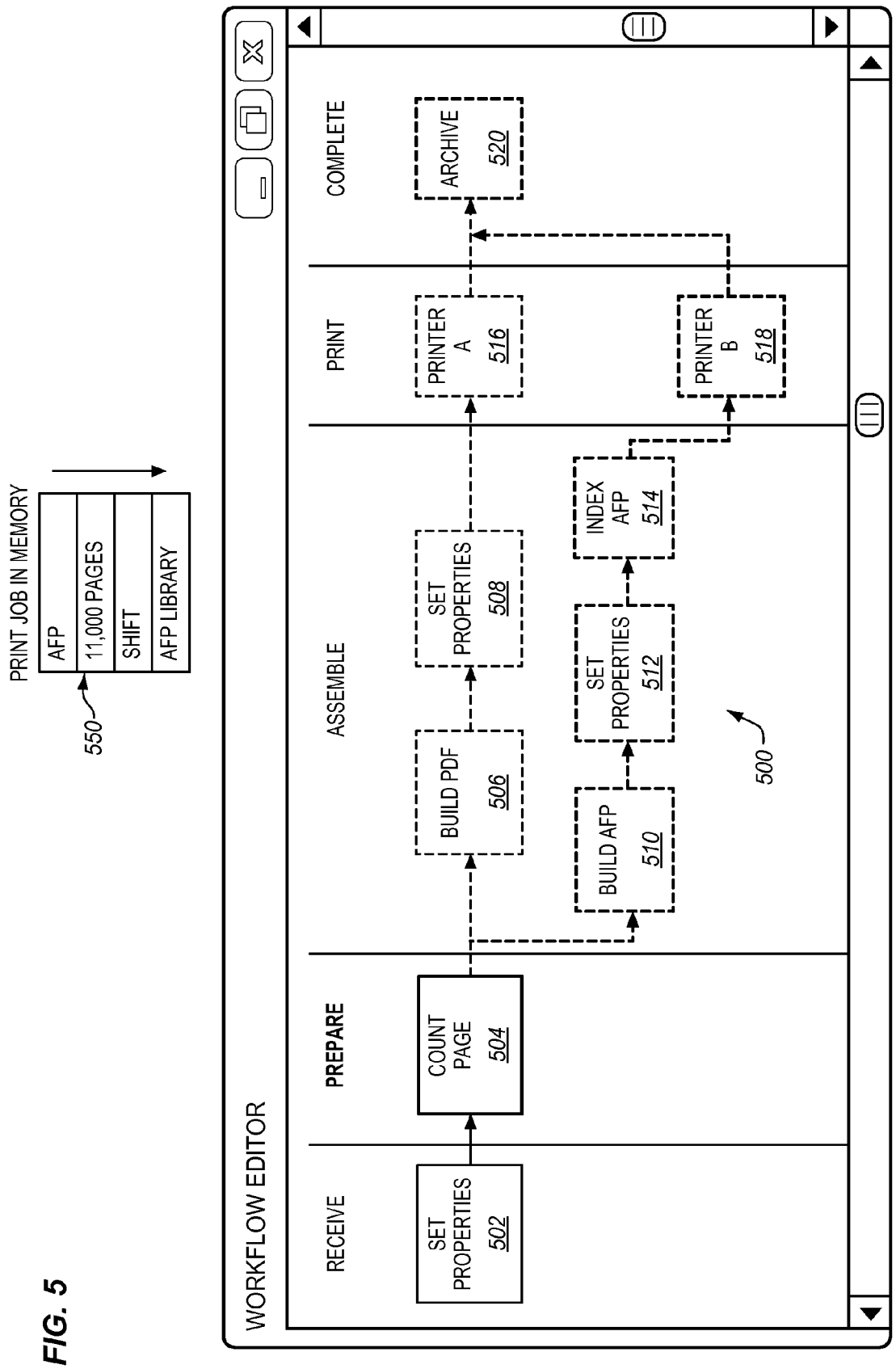
FIG. 5 is illustrates a GUI of a predicted workflow in an exemplary embodiment.

In the following examples, additional processes, systems, and methods are described in the context of a workflow system for a print shop. Specifically, FIGS. 5-6 are block diagrams illustrating a GUI (e.g., GUI 126) of a predicted print workflow 500 in an exemplary embodiment. Assume, for the sake of this example, that the processor 220 has received a print job in the Advanced Function Presentation (AFP) print format (e.g., element 550), has stored the print job and related job properties in database 232, and has assigned the print job to print workflow 500 for processing in accordance with steps 502-520.

Further assume for this example that the processor 220 has initiated processing of the print job and has completed execution of step 502 in the Receive phase and that the print job is currently being processed in accordance with step 504 in the Prepare phase. In this example, bolded solid lines indicate the path that the print job has already traveled, the currently executing step (e.g., step 504), and the current phase of the print job in the print workflow 500 (e.g., Prepare phase).

In response to a user input to view a predicted path of for the print job, the controller 202 of the workflow simulator 124 copies job properties of the print job (e.g., element 550) from the database 230 to memory 210. The controller 202 communicates with processor 220 or accesses database 230 to determine a current step in the print workflow 500 which has not yet completed execution. In this case, the controller 202 determines that the print job is currently being processed in accordance with step 504 of the print workflow 500.

The controller 202 evaluates step 504 with values of the copied job properties stored in memory 210. Step 504 executes a page count which determines, in this example, that the print job includes 11,000 pages. The 11,000 page count is added to the copied job properties stored in memory 210 (see e.g., element 550).

After completion of the simulated execution of step 504, the controller 202 determines that the print workflow 500 includes a conditional branch that routes print jobs to one of multiple possible paths (e.g., decision on whether to proceed to step 506 or alternative step 510). The controller 202 evaluates the conditions of steps 506 and 510. As seen in FIG. 6 (and discussed in more detail below), steps 506 and 510 have been configured with if/then/else logic, wherein print jobs are to proceed to step 506 if the print job format is Portable Document Format (PDF), otherwise the print job proceeds to step 510. The controller 202 evaluates the conditions against the copied job properties, and determines to proceed to step 510 since the print job is in an AFP format.

Thus, the controller 202 has predicted a future step (e.g., step 510) of the print job by processing copied job properties with step conditions in the print workflow. In this example, the predicted path and steps are indicated as such by bolded dashed lines. Next, the controller 202 evaluates step 510 which builds AFP data for the print job, and subsequently evaluates step 512, which shifts printed images on the pages of the print job in accordance with administrator-set rules of step 512. The controller 202 continues to follow the logical connections and evaluates step 514 which specifies the AFP resource library to use if the print job is to be converted to AFP for printing. For each predicted step that include conditions that serve to update or add job properties (e.g., step 512 and step 514), the controller 202 changes or updates job properties (see e.g., 550) in memory 210 accordingly before the next step is evaluated.

Next, the controller 202 evaluates conditions of the subsequent conditional branch, and determines to proceed to step 518 and print with Printer B since the print job includes more than 10,000 pages. The simulation continues to step 520, evaluates step 520, and then determines that no subsequent steps exist for the predicted path. The predicted path (e.g., bolded dashed lines) is displayed to the user via the GUI, along with potential steps in the print workflow 500 which are not predicted for the print job (e.g., non-bolded, dashed lines).

FIG. 6 illustrates a GUI for editing steps of a print workflow in an exemplary embodiment. Here, the GUI presents each of the steps 502-520 in the print workflow 500 and allows users to edit conditions, rules, and assigned durations to each step. In this example, step 510 is estimated to build AFP data in 20 seconds for each 1,000 kilobytes of a print job. However, a history of averaged statistical data may suggest step 510 typically performs in 30 seconds for each 1,000 kilobytes of a print job. The user may therefore select a step (e.g., see step 510 in FIG. 6), and apply an appropriate change to the duration and/or unit(s) of duration accordingly. Alternatively or additionally, the controller 202 may update duration information for steps based on averaged historical data for certain customers or print workflows.

Since steps 502-520 in the print workflow have assigned durations, the controller 202 calculates a sum of each remaining predicted step in the print workflow 500 to determine a total estimated completion time for the print job. The controller 202 therefore determines a duration value for steps 504, 510, 512, 514, 518, and 520, and displays the total to the user via the GUI. Alternatively or additionally, the total duration may displayed on or near the predicted path of the print workflow 500.

With knowledge of the predicted path and estimated time for the predicted path, a user may make a determination as to whether apply changes to the print job, print workflow, or certain steps within the print workflow. Moreover, the controller 202 enables a user to simulate any changes in memory 210 so that alternative paths may be predicted/estimated before such changes are applied to the print job that is to be or is being processed from the database 230.

Figure 7:
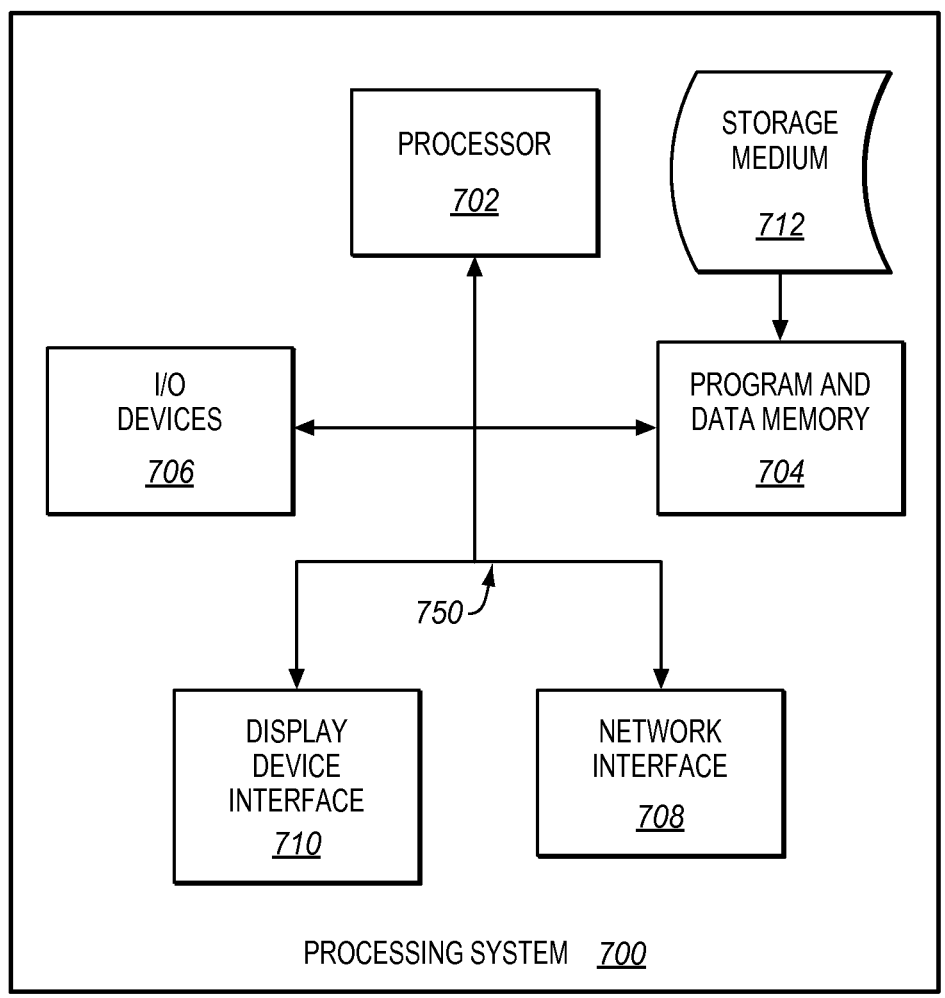
FIG. 7 illustrates a processing system operable to execute a computer readable medium embodying programmed instructions to perform desired functions in an exemplary embodiment.

Processing systems herein (e.g., controller 202 and/or processor 220) may be implemented, for example, as custom circuitry or a general purpose processor executing programmed instructions stored in an associated program memory, or some combination thereof. While workflow simulator 124 and print system control 128 are illustrated as independent elements, in some embodiments elements may be integrated in a print server at the print shop 100. Embodiments disclosed herein can take the form of software, hardware, firmware, or various combinations thereof. In one particular embodiment, software is used to direct processing system(s) of the print server 120 to perform the various operations disclosed herein. FIG. 7 illustrates a processing system 700 configured to execute a computer readable medium embodying programmed instructions to perform desired functions in an exemplary embodiment. Processing system 700 is configured to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, SCSI, Fibre Channel, and Ethernet cards are just a few of the currently available types of network or host interface adapters. Presentation device interface 710 may be integrated with the system to interface to one or more presentation devices, such as printing systems and displays for presentation of presentation data generated by processor 702. Although specific embodiments were described herein, the scope of the inventive concept(s) is not limited to those specific embodiments. The scope of the inventive concept(s) is defined by the following claims and any equivalents thereof.

We claim:

1. A system comprising:
a controller configured to identify a print workflow that includes interconnected steps that perform processing tasks for print jobs, wherein at least one of the steps include conditional branching of multiple potential paths for print jobs through the print workflow;
the controller configured to identify a print job, to generate a copy of the print job, and to simulate an execution of a step in the print workflow with the copy of the print job, wherein the execution comprises:
determining whether the step includes conditional branching;
when the step includes conditional branching, predicting a subsequent step by evaluating conditions of the step against values of copied job properties of the print job; and
updating the copied job properties based on the execution of the step;
the controller configured to repeat the execution for each subsequently predicted step in the print workflow in order to predict a path of the print job in the print workflow; and
a graphical user interface (GUI) configured to display the path that is predicted for the print job in the print workflow.

2. The system of claim 1 wherein:
the controller is configured to calculate an estimated completion time for the print job based on an assigned duration value to each predicted step in the path of the print workflow; and
the GUI is configured to display the estimated completion near the path that is predicted for the print job.

3. The system of claim 1 wherein:
the controller is configured to determine whether the step includes impermissible values; and
the GUI is configured to display an error message that identifies the step with the impermissible values.

4. The system of claim 1 wherein:
the GUI is configured to receive input that indicates a change to the copied job properties; and
the controller is configured to predict a path for the print job in the print workflow based on the change to the copied job properties.

5. The system of claim 1 wherein:
the GUI is configured to receive input of a selected step in the print workflow, and to display paths of a plurality of print jobs predicted to reach the selected step.

6. The system of claim 1 wherein:
the controller configured to apply duration values to steps in the print workflow based on historical data of the print workflow, and to determine an estimated completion time for the print job based on the applied duration values of each predicted step in the path of the print workflow.

7. A method comprising:
identifying a print workflow that includes interconnected steps that perform processing tasks for print jobs, wherein at least one of the steps include conditional branching of multiple potential paths for print jobs through the print workflow;
identifying a print job, to generate a copy of the print job, and to simulate an execution of a step in the print workflow with the copy of the print job, wherein the execution comprises:
determining whether the step includes conditional branching;
when the step includes conditional branching, predicting a subsequent step by evaluating conditions of the step against values of copied job properties of the print job; and
updating the copied job properties based on the execution of the step;
repeating the execution for each subsequently predicted step in the print workflow in order to predict a path of the print job in the print workflow; and
displaying the path that is predicted for the print job in the print workflow.

8. The method of claim 7 comprising:
calculating an estimated completion time for the print job based on an assigned duration value to each predicted step in the path of the print workflow; and
displaying the estimated completion near the path that is predicted for the print job.

9. The method of claim 7 wherein:
determining whether the step includes impermissible values; and
displaying an error message that identifies the step with the impermissible values.

10. The method of claim 7 comprising:
receiving input that indicates a change to the copied job properties; and
predicting a path for the print job in the print workflow based on the change to the copied job properties.

11. The method of claim 7 comprising:
receiving input of a selected step in the print workflow; and
displaying paths of a plurality of print jobs predicted to reach the selected step.

12. The method of claim 7 comprising:
applying duration values to steps in the print workflow based on historical data of the print workflow; and
determining an estimated completion time for the print job based on the applied duration values of each predicted step in the path of the print workflow.

13. A non-transitory computer readable medium embodying programmed instructions which, when executed by a processor, are operable to perform a method comprising:
identifying a print workflow that includes interconnected steps that perform processing tasks for print jobs, wherein at least one of the steps include conditional branching of multiple potential paths for print jobs through the print workflow;
identifying a print job, to generate a copy of the print job, and to simulate an execution of a step in the print workflow with the copy of the print job, wherein the execution comprises:
determining whether the step includes conditional branching;
when the step includes conditional branching, predicting a subsequent step by evaluating conditions of the step against values of copied job properties of the print job; and
updating the copied job properties based on the execution of the step;

repeating the execution for each subsequently predicted step in the print workflow in order to predict a path of the print job in the print workflow; and displaying the path that is predicted for the print job in the print workflow.

14. The medium of claim 13 the method comprising:

calculating an estimated completion time for the print job based on an assigned duration value to each predicted step in the path of the print workflow; and displaying the estimated completion near the path that is predicted for the print job.

15. The medium of claim 13 the method comprising:

determining whether the step includes impermissible values; and displaying an error message that identifies the step with the impermissible values.

16. The medium of claim 13 the method comprising:

receiving input that indicates a change to the copied job properties; and predicting a path for the print job in the print workflow based on the change to the copied job properties.

17. The medium of claim 13 the method comprising:

receiving input of a selected step in the print workflow; and displaying paths of a plurality of print jobs predicted to reach the selected step.

18. The medium of claim 13 the method comprising:

applying duration values to steps in the print workflow based on historical data of the print workflow; and determining an estimated completion time for the print job based on the applied duration values of each predicted step in the path of the print workflow.

* * * * *